June 28, 1955 R. H. CARLSTRAND ET AL 2,711,648
WIND TUNNEL MODEL SUPPORT MECHANISM
Filed Nov. 16, 1953 3 Sheets-Sheet 2

INVENTORS.
Ralph H. Carlstrand
Charles M. Howard
William H. Gayman

By Hubert E. Metcalf
Their Patent Attorneys

June 28, 1955  R. H. CARLSTRAND ET AL  2,711,648
WIND TUNNEL MODEL SUPPORT MECHANISM
Filed Nov. 16, 1953  3 Sheets-Sheet 3

INVENTORS:
Ralph H. Carlstrand
Charles M. Howard
William H. Gayman

By Herbert E. Metcalf
Their Patent Attorney

United States Patent Office 2,711,648
Patented June 28, 1955

2,711,648

WIND TUNNEL MODEL SUPPORT MECHANISM

Ralph H. Carlstrand, Los Angeles, Calif., Charles M. Howard, Shelbyville, Tenn., and William H. Gayman, Burbank, Calif., assignors to Northrop Aircraft, Inc., Hawthorne, Calif., a corporation of California Application November 16, 1953, Serial No. 392,215

12 Claims. (Cl. 73—147)

My invention relates to support mechanisms and more particularly to a flutter model support mechanism which can effectively and accurately simulate flutter and vibrational reactions on an airplane.

Models presently used for testing flutter and vibrational effects on the wings, fuselage, etc. have proved inadequate in so far as obtaining the degree of accuracy required in the design of high-speed aircraft. Their prime disadvantage is that movement of the wing is constrained to rotary motion so that the wing when tested in a wind tunnel swings as a pendulum. This pendulum effect causes the wing to have a certain potential energy at the end of each swing which when coupled with the flutter or vibrational forces being impressed thereon results in mode shapes of the wing which do not represent the true shapes which the wing would assume under actual flight. The reason for this is in the fact that during flight the wing and fuselage have motion of translation, i. e., upward and downward motion, as well as rotary motion. Present day attempts to obtain accurate test data from wind tunnel experiments by subtracting out the error resulting from the pendulum effect or by ignoring it have proved to be laborious and inaccurate.

Another disadvantage encountered in use of the present day models is the improper simulation of the spanwise distribution of lift and the angle of attack. This results from the fact that the root of the wing is precluded from any motion of translation.

By virtue of my invention it is now possible to give a more representative picture of actual flight conditions. Translatory motion as well as rotary motion is transmitted to the wing and fuselage imparting the pure or true mode shapes to them which in turn results in more accurate test data. Generally, my invention utilizes a straight link or "Watts linkage" to impart a translatory as well as rotary motion to the parts under test. Fuselage stiffness is properly simulated by using an ear shaped holding member and a retaining spool for securing the wing spar. In addition, greater accuracy has been obtained by virtue of simulating the mass-moment of inertia of the fuselage properly.

Another advantage of my invention is the great time saving which occurs by eliminating the necessity of subtracting out the error due to the pendulum effect of present day flutter test mechanisms.

An added feature of my invention is a new and novel method of attaching the wing shell panels. By this method it is possible to get the most representative effect of the flutter on the wing. Another improved feature is a means for adjusting the wing so that it may be subjected to any desired angle of attack.

It is therefore a general object of my invention to provide a flutter model support mechanism effective to render accurate test data in regard to flutter and vibrational effects upon various component parts of an airplane.

A more specific object of my invention is to provide a flutter model support mechanism which is designed to permit flutter and vibrational excitation imparted to aircraft components, such as the wings, fuselage, etc. to be transmitted as motion of translation or rotary motion whichever is the case.

Another object of my invention is to eliminate the pendulum effect imparted to aircraft wings during flutter tests in wind tunnels.

A further object of my invention is to provide a means for giving an accurate representation of the effect on aircraft wings of flutter and vibration in regard to spanwise lift distribution and angle of attack.

Still another object of my invention is to provide a new and novel means of securing the shell panels to the wing spar, thus eliminating drilling holes in the structure with the concomitant alteration of the moment of inertia.

Other objects and uses will manifest themselves from the subsequent disclosure and drawings forming part of the specification wherein.

Figure 1:
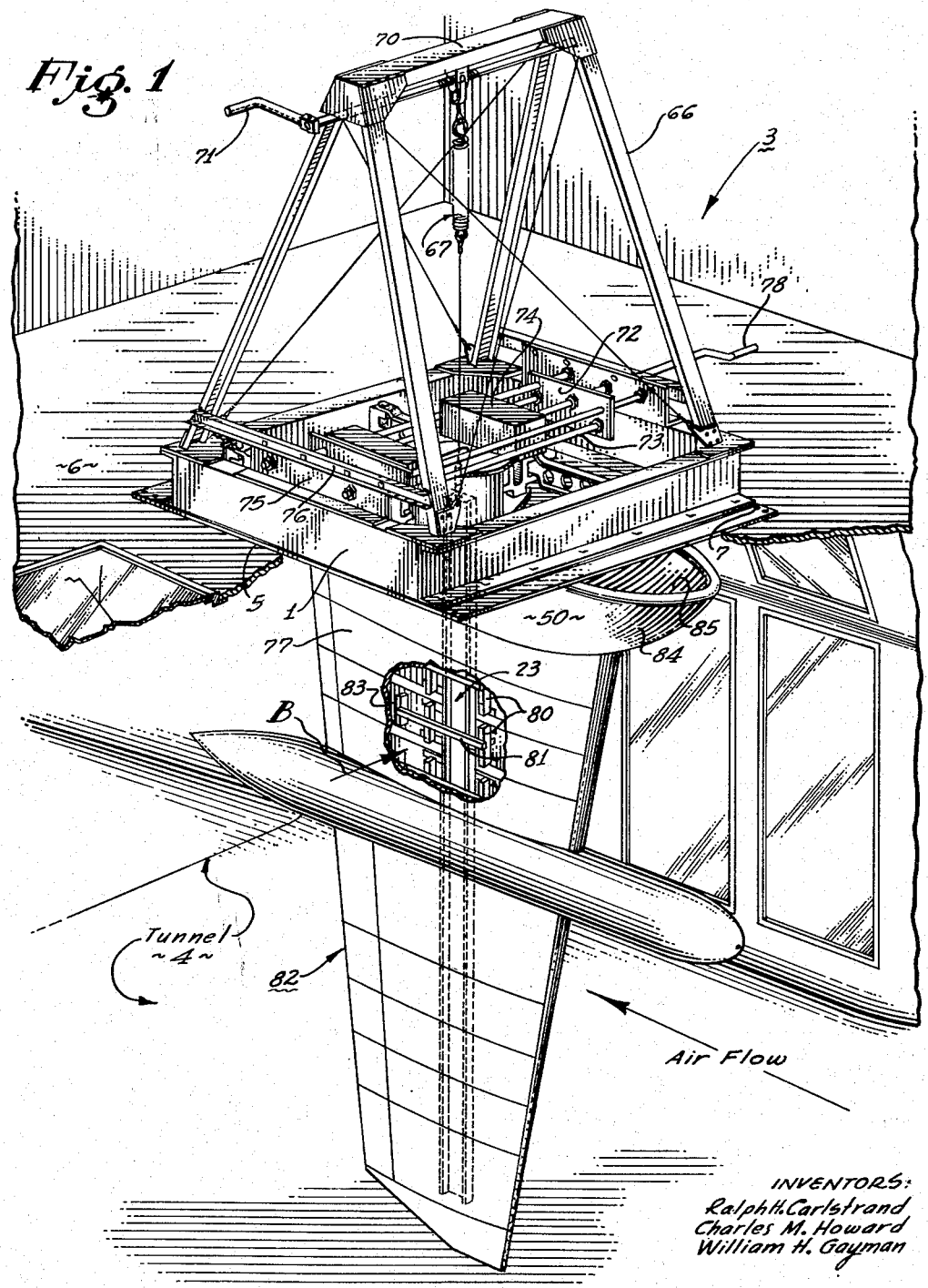
Figure 1 is a front elevation of my invention as it appears in a wind tunnel broken away to show the model support mechanism in toto.
Figure 2:
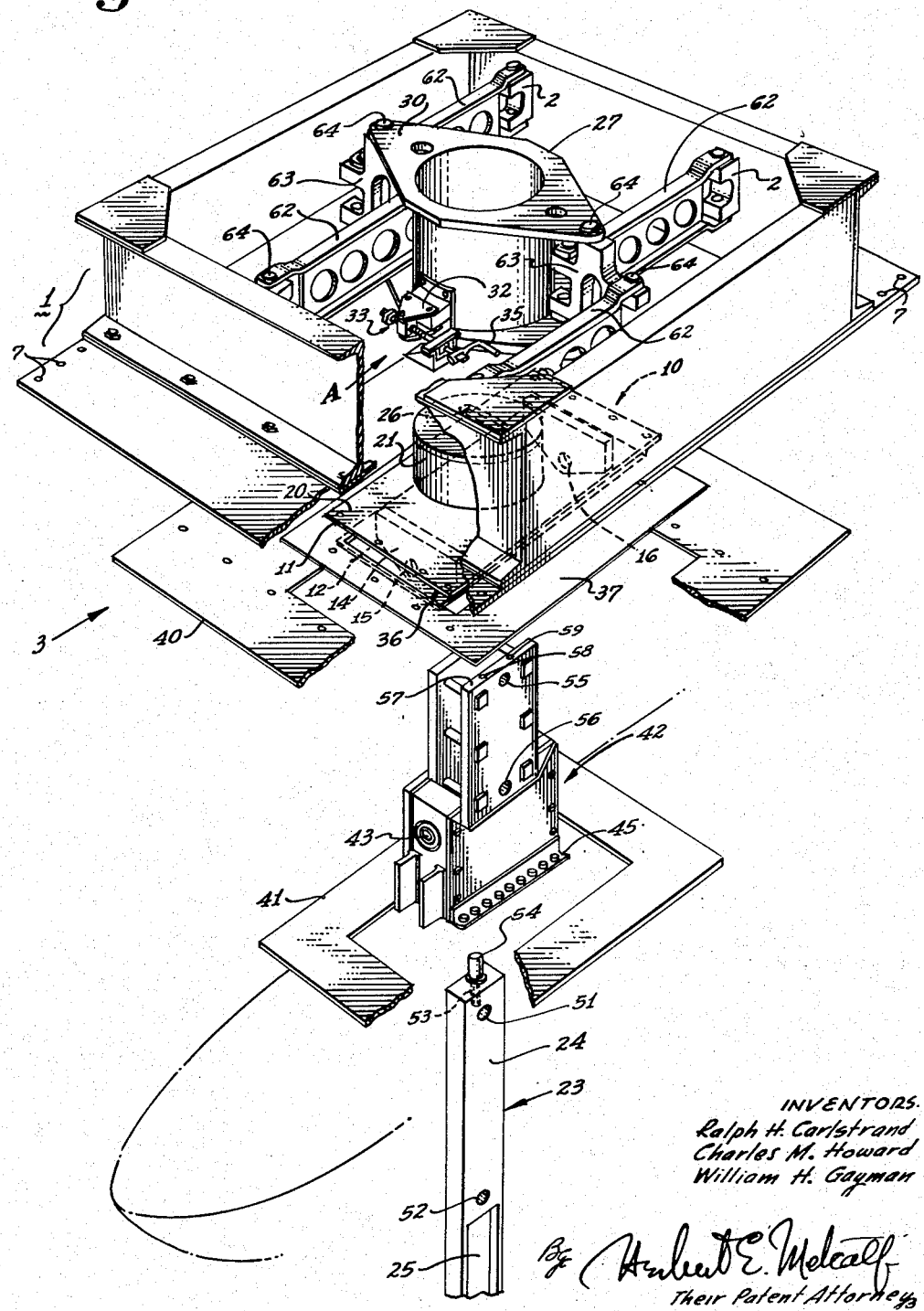
Figure 2 is an exploded view of a portion of the support mechanism.
Figure 3:
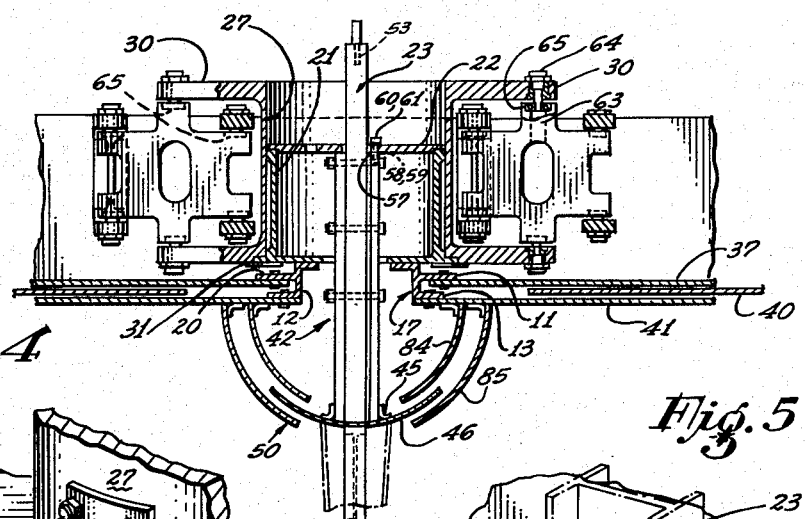
Figure 3 is a cross-sectional view of the mechanism along line 3—3 of Figure 2.
Figure 4:
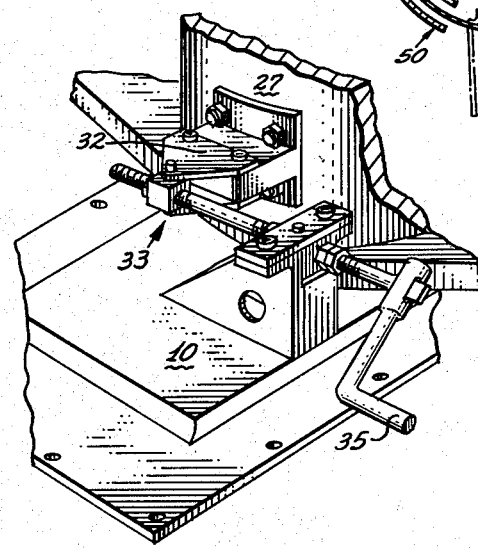
Figure 4 is an enlarged fragmentary section of the hand lever assembly at arrow A of Figure 2.
Figure 5:
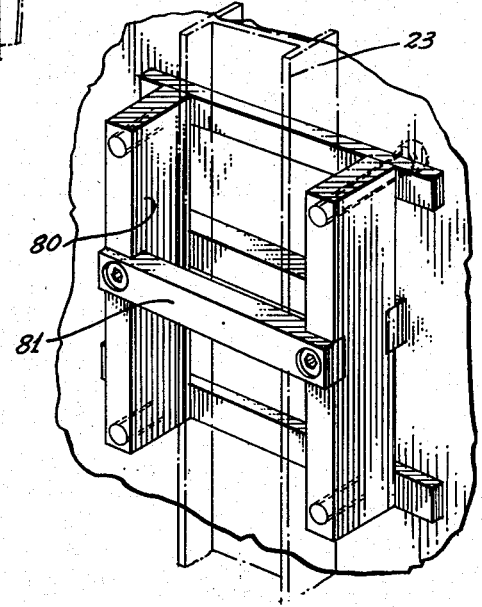
Figure 5 is an enlarged view of the intercostals of the shell panels at arrow B of Figure 1.

For a detailed description of my invention, reference is had to the drawings wherein a support frame 1 having four inwardly projecting hinges 2, is used to support the flutter model support 3 against the ceiling of a wind tunnel 4 in which the particular aircraft component is to be tested. An opening 5 is provided in the wind tunnel ceiling 6 so that the frame 1 may be bolted thereto by bolts 7. A support pan 10 of box-like configuration is fabricated with its top plate 11 of larger dimensions than that of its sides 12, said sides terminating in a flange section 13 to enable another plate to be secured to it. Two trunnion blocks 14, Figure 2, having tapped holes 15 and 16 respectively are secured to the underneath surface of the support pan 10. The pan 10 is also provided with a centrally located aperture 17, Fig. 3. Seated on the upper surface 20 of the pan 10 is a spool casing 21 which is bolted to the pan 10 around aperture 17. Releasably fastened to the casing 21 is a retaining plate 22 for holding the component part under test analysis.

Where the aerodynamic characteristics of a wing are under consideration a wing spar 23 partially of rectangular cross-section 24 and partially of an I-beam cross-section 25 is utilized. The retaining plate 22 is formed with a slot 26 of substantially the same configuration as the spar 23. Disposed around the spool casing 21 is a spool bearing yoke 27 having yoke supporting arms 30 and base retaining plates 31 for retaining the casing 21 within the yoke 27. Affixed to the side of the yoke 27 is a bracket member 32 which supports a hand-crank gear assembly 33, essentially a worm and rack arrangement which is secured to the support pan 10. This in turn enables the support pan 10, the spool casing 21 and all other parts to which they are secured to be rotated by the hand crank 35 approximately 6 to 10 degrees, thus altering the angle of attack to that extent as will be seen from the subsequent paragraphs.

Bolted to the underneath side 36 of the top plate of the support pan 10 is the top seal plate 37 which is nearly the size of the inner dimensions of the support frame 1. Taken into account in determining the size of the seal plate 37 is the amount of translation and rotation within the frame 1 to which the plate 37 will be subjected during testing. The plate 37 may be two elongated aluminum strips with a honeycomb material between them and is seated within the base of the frame 1 effective to translate with respect thereto. The sides 12 and flange section 13 of the support pan 10 extend downwardly from the frame base 40 and slightly into the wind tunnel 4. A bottom seal plate 41 of similar composition to that of the top plate 37 is bolted to the flange section 13 and forms the ceiling of the tunnel 4 to replace the portion that was cut out for the frame 1.

A spar-clamp 42 into which a set of roller bearings 43 are seated is secured to the support pan 10 by passing a rod (not shown) having a tight fit with the bearings 43 through the trunnion blocks 14 and securing the rod to the blocks 14 in any conventional manner. Affixed to the clamp 42 are flanges 45 for holding a rotatable member 46 which rolls within the aperture 47 of a faring or simulated fuselage 50, the faring being secured to the bottom seal plate 41. The solid section 24 of the spar 23 is formed with two through bores 51 and 52, and a tapped hole 53 into which a lug 54 is threadably engaged. The spar 23 is extended through the clamp 42 so that two holes 55 and 56 in the clamp 42 are aligned with those of the spar 23 and then they are clamped together by bolts passing through the aligned holes. At the upper end 57 of the clamp 42 two tapped holes 58 and 59 enable the clamp 42 to be secured to the retaining plate 22 by two threaded bolts 60 and 61. The spool bearing yoke 27 is supported and constrained to straight line motion by means of a "Watts" type linkage which comprises four magnesium links 62 hinged at one end to the frame hinges 2 and at the other end to two aluminum links 63. These latter links 63 are secured to the yoke arms 30 by a shaft 64 seated in self-aligning ball bearings 65 which are fitted in the bores of the aluminum links 63 for freedom of movement. Rigidly attached to the top of the support frame 1 is an A-frame 66 having a cable-tension spring assembly 67 suspended from the top bar 70 of the A-frame 66 and translatable by means of a hand lever 71. Two stop plates 72 having rubber stoppers (not shown) affixed thereto flank the spool bearing yoke 27 and are supported on a plurality of rods 73. Dummy plates 74 are added where the tested plane is a heavier one than that for which the model support mechanism 3 was designed. The rods 73 are fastened against flange plates 75 secured to the support frame 1 and the crossbar 76 of the A-frame. The stop plates 72 may be positioned mechanically, by a lever 78, or manually, their position being dependent on the translational limits of the yoke 27.

Figure 6:
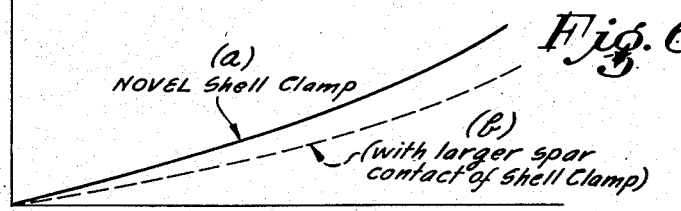
Figure 6 is a comparative curve showing deflection versus spar length when using the novel shell clamp.

For convenience of testing, the scale model wing is composed of numerous shell panels 77 which are individually clamped on to the spar 23. The shell panels 77 are fabricated with intercostals 80 which enable a shell clamp 81 to be positioned against the wing spar 23 with minimum contact of the clamp 81 with the spar 23. This enables the wing spar 23 to bend during test to approximately the same extent to which it would under conditions of flight. Where the spar 23 is clamped with more than a small amount of the metal in contact with the clamp 81 the curvature experienced is inaccurate. Figure 6 illustrates this, curve (a) being the desirable curve, curve (b) illustrating the condition of too great a contact of spar 23 and clamp 81. The mass properties of the wing 82 are simulated by fixing dummy lead weights 83 to the shell 77 and to the shell clamp 81. The aforementioned method of attaching the shell panels 77 to the spar 23 eliminates the necessity of putting points of stress concentration, such as holes, in the I-beam portion 25 of the spar 23, thus rendering a truer aerodynamic picture. Where aircraft components other than wing and fuselage assemblies are to be tested, the flutter model support may be adapted accordingly to test them. The spar-clamp 42 can be substituted with another clamping member capable of securing the part to be tested.

The operation of my invention in view of the structural recitation follows. Where it is desired to test the flutter and vibrational characteristics of a wing-fuselage assembly, tests may be run on the inventive mechanism wherein the wing 82 may be constrained to rolling motion, motion of translation, or both types of motion simultaneously. The wing 82 is positioned by the hand lever 35 so that the angle of attack is zero.

For rolling motion only the threaded bolts 60 and 61 and the retaining plate 22 are removed, and the stop plates 72 positioned against the spool bearing yoke 27. The air stream in the wind tunnel 4 is thus able to rock the wing 82 within the limits of the spool casing 21. Translatory motion is obtained by securing the retaining plate 22 around the spar 23 and onto the casing 21 and tightening the threaded bolts 60 and 61 into their mating holes 58 and 59. This constrains the spar 23 to lateral motion only, the limit of such movement being determined by the position of the stop plates 72. Both translatory and rolling motion are possible if the retaining plate 22 remains secured to the casing 21 and the threaded bolts 60 and 61 are removed, the rolling motion being confined within the slot 26 fabricated in the retaining plate 22. When both the plate 22 and the threaded bolts 60 and 61 are secured and the stop plates 72 positioned against the yoke 27, the wing 82 is rigid and its bending characteristics as a cantilever beam may be analyzed.

In order to prevent any damaging experimental effects from the air flowing in the tunnel and yet providing seal plates which would be freely flowing, the seal plates 37 and 41 and the support pan 10 are so constructed as to greatly minimize the air effect on the spool bearing yoke 27, etc. The air flowing upward through the bottom seal plate 41 must detour around the support pan 10 and then alter direction once again when the air flows over the top seal plate 37. Similarly air flowing in at the faring 50 must first flow between the outer faring skin 84 and the rotatable member 46 and then reverse direction and flow between the inner faring skin 85 and the member 46. In both cases the force of the air is greatly diminished before it reaches the component parts above the support frame 1.

As the wing 82 is being translated, the "Watts" linkage constrains the yoke 27 to straight line motion until its progress is prevented by the stop plates 72. The weight of the simulated wing 82 is taken up in the spring-cable assembly 67 connected to the spar lug 54 which assembly 67 is free to elongate as the yoke 27 is translated across the frame 1.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A flutter support mechanism for testing flutter and vibrational characteristics of a scale model aircraft component in a wind tunnel comprising: a support frame releasably secured to the ceiling of said tunnel and forming a part thereof; a plurality of links pivotally connected to said frame at one end thereof; a plurality of connecting links joined at either end thereof to the other end of said plurality of links; a spool bearing yoke pivotally connected to said connecting links, the interaction of said plurality of links and said connecting links being effective to constrain said yoke to straight line motion; a spool bearing casing disposed within said yoke and retained therein; a support pan having a central aperture therein and trunnion blocks disposed on either side of said aperture, said pan affixed to the base of said casing so that the respective apertures are in substantial alignment; an upper seal plate fixed to said support pan and resting within said frame; a lower seal plate fixed to said support pan and resting outside said frame, said seal plates effective to both substantially break down the air flow passing over said links and to translate with respect to said support frame; and clamping means for holding said aircraft component, said means pivotally secured to said trunnion means.

2. A flutter support mechanism in accordance with claim 1 further characterized by constraining means releasably secured to said spool casing effective to prevent rotation of said aircraft component.

3. A flutter support mechanism in accordance with claim 1 further characterized in that said spool bearing casing is secured at its base to said support pan, the spool bearing yoke is disposed about said casing and effective to retain said casing therein, and said connecting links are attached to said spool bearing yoke so that said yoke is constrained to motion of translation by virtue of the interaction of said connecting and plurality of links.

4. A flutter support mechanism for testing flutter and vibrational characteristics of a scale model aircraft and component in a wind tunnel comprising: a support frame having a plurality of frame hinges secured within a ceiling cavity of said wind tunnel and to that extent forming the ceiling of said tunnel; a plurality of links pivotally secured at one end to said frame hinges; a plurality of connecting links attached at either end to said pivotal links; a spool bearing yoke pivotally connected to said connecting links in such fashion that movement of said yoke is constrained to straight line motion; a spool bearing casing placed within said yoke and retained therein; a retaining plate having an aperture therein releasably secured to said casing; a support pan having a central aperture therein, trunnion means on either side of said aperture, and flanging means adjacent said trunnion means and extending outwardly from the sides of said pan, said pan secured to the base of said casing; an upper seal plate fixed to said support pan and resting within said support frame, the sides of said pan protruding downwardly and outside of said support frame; a lower seal plate secured to said flanging means of said support pan; and clamping means pivotally secured to said trunnion means effective to secure said aircraft component, movement of said component due to the airstream with the tunnel being constrained to rolling motion and motion of translation.

5. A flutter support mechanism in accordance with claim 4 further characterized by a rigid mounting frame attached to and extending upwardly from said support frame and a spring cable assembly mounted thereon effective to secure said aircraft component.

6. A flutter support mechanism in accordance with claim 5 further characterized by a plurality of rods fixed to the sides of said support frame and stop plates adapted to be positioned on said rods, said stop plates effective to limit the travel of said yoke to the distance between said plates.

7. Apparatus of the class described for testing flutter and vibrational characteristics in a wind tunnel comprising: a support frame having a plurality of frame hinges secured within a ceiling cavity of said wind tunnel; a plurality of links pivotally secured at one end to said frame hinges; a plurality of connecting links attached at either end to said pivotal links; a spool bearing yoke pivotally connected to said connecting links in such fashion that movement of said yoke is constrained to straight line motion; a spool bearing casing placed within said yoke and retained therein by said yoke; a retaining plate having a slot therein, said retaining plate releasably secured to said casing; a support pan having a central aperture therein, trunnion means disposed on either side of said aperture, and flanging means extending outwardly from the open side of said pan, said pan secured to the base of said casing so that the respective apertures are in substantial alignment; an upper seal plate fixed to said support pan and resting within said support frame, the sides of said pan protruding downwardly and outside of said support frame; a lower seal plate secured to said flanging means of said support pan; clamping means pivotally secured to said trunnion means; a wing spar having a lug at one end thereof, said spar extending through said clamping means, support pan, and spool casing retaining plate aperture; a plurality of shell panels having intercostals therein; shell clamping means secured to said intercostals to contact a minimum area of said spar, said clamping means effective to enable said spar to bend in a curve substantially the same as experienced in actual flight; and rigid mounting means attached to, and extending upwardly from said support frame, said mounting means effective to support said spar and concomitant parts attached thereto.

8. Apparatus of the class described in accordance with claim 7 further characterized by a plurality of rods fixed to the sides of said support frame and stop plates adapted to be positioned on said rods, said stop plates effective to limit the travel of said yoke to the distance between said plates.

9. Apparatus of the class described in accordance with claim 8 further characterized by the fact that said rigid mounting means comprises an A-type frame and a spring-cable assembly suspended from the top thereof, said assembly securing said spar at the lug thereof.

10. Apparatus of the class described in accordance with claim 9 further characterized by constraining means releasably secured to said spar effective to prevent rotation of said spar within the aperture of said retaining plate.

11. Apparatus of the class described in accordance with claim 10 further characterized by turning means connected to said casing effective to rotate the axial position of said spar.

12. Apparatus of the class described in accordance with claim 11 further characterized by a faring having an aperture therein for said spar to pass through, said faring secured to said lower seal plate, and a rotatable member effective to pivot within said faring, said member secured to the base of said spar clamp in such fashion as to break down the air flow passing into said faring.

References Cited in the file of this patent

UNITED STATES PATENTS

| | | |
|---|---|---|
| 2,065,496 | Adams | Dec. 29, 1936 |
| 2,448,528 | Hevver | Sept. 7, 1948 |
| 2,612,776 | Klas | Oct. 7, 1952 |

OTHER REFERENCES

Runyon et al., NACA Technical Note No. 1594, June 1948, "Experimental Investigation—Straight Cantilever Wing" pp. 1 to 7, 15 and 17.